(12) United States Patent
Chestnut (10) Patent No.: US 7,143,037 B1
(45) Date of Patent: Nov. 28, 2006

(54) SPELLING WORDS USING AN ARBITRARY PHONETIC ALPHABET

(75) Inventor: Kevin L. Chestnut, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 909 days.

(21) Appl. No.: 10/171,327

(22) Filed: Jun. 12, 2002

(51) Int. Cl.
G10L 15/04 (2006.01)

(52) U.S. Cl. .................. 704/251; 704/254
(58) Field of Classification Search ........... 704/251, 704/254

See application file for complete search history.

(56) References Cited

U.S. PATENT DOCUMENTS

| | | | |
|---|---|---|---|
| 4,769,844 A | 9/1988 | Fujimoto et al. ............ 381/42 |
| 5,638,425 A | 6/1997 | Meador, III et al. ......... 379/88 |
| 5,890,117 A * | 3/1999 | Silverman ................. 704/260 |
| 6,304,844 B1 | 10/2001 | Pan et al. ................. 704/257 |
| 6,321,196 B1 * | 11/2001 | Franceschi ................ 704/243 |
| 6,377,965 B1 | 4/2002 | Hachamovitch et al. .... 707/534 |
| 6,405,170 B1 | 6/2002 | Phillips et al. ............ 704/270 |
| 6,584,179 B1 | 6/2003 | Fortier et al. ........... 379/88.01 |
| 6,629,071 B1 * | 9/2003 | Mann ...................... 704/251 |
| 6,687,673 B1 * | 2/2004 | Mann ...................... 704/244 |
| 6,694,296 B1 * | 2/2004 | Alleva et al. ............. 704/255 |
| 6,952,675 B1 | 10/2005 | Tahara et al. ............. 705/255 |
| 6,975,986 B1 * | 12/2005 | Hartley et al. ............ 704/254 |

* cited by examiner

Primary Examiner—Vijay Chawan
Assistant Examiner—Leonard Saint-Cyr
(74) Attorney, Agent, or Firm—Baker Botts L.L.P.

(57) ABSTRACT

Words are spelled by receiving recognizable words from a user of an interactive voice response system. The first letter of each recognizable word is identified, and a spelling is determined based on the first letters of the recognizable words. Statistics for previous users of the interactive voice response system are determined, where the statistics indicate the number of times each of the recognizable words has been used to indicate a letter. The recognizable word that is most commonly used for each letter is identified. The user is prompted with at least two recognizable words that are most commonly used, where each recognizable word corresponds to a different letter. A selection of one of the recognizable words provided to the user is received.

22 Claims, 5 Drawing Sheets

FIG. 1

| CATEGORY | LETTER | WORDS | MOST COMMON |
|---|---|---|---|
| ANIMAL | A | AARDVARK ANTELOPE ⋮ | AARDVARK |
| | B | BEAR BADGER ⋮ | BEAR |
| | ⋮ | ⋮ | ⋮ |
| COMMON PHONETIC ALPHABETS | A | ABEL ALPHA | ALPHA |
| | B | BAKER BRAVO | BRAVO |
| | ⋮ | ⋮ | ⋮ |
| NAMES | A | ALAN ANDY ⋮ | ANDY |
| | B | BOB BILL ⋮ | BOB |
| | ⋮ | ⋮ | ⋮ |
| PLANTS | A | APPLE ARTICHOKE ⋮ | APPLE |
| | B | BANANA BROCCOLI ⋮ | BANANA |

SPELLING WORDS USING AN ARBITRARY PHONETIC ALPHABET

TECHNICAL FIELD OF THE INVENTION

This invention relates in general to interactive voice response systems, and more particularly to a method for spelling words using an arbitrary phonetic alphabet.

BACKGROUND OF THE INVENTION

Interactive voice response servers allow a user to interact with a computer system using only the user's voice. This greatly increases the flexibility and availability of computer systems. But when voice is the only method of accessing a system, it may be difficult to determine the spelling of particular spoken words received from the user. Consequently, important information such as people and place names may be lost when using an interactive voice response system.

SUMMARY OF THE INVENTION

In accordance with the present invention, the disadvantages and problems associated with determining a spelling for a spoken word received from a user of an interactive voice response system have been substantially reduced or eliminated. In particular, certain embodiments of the present invention provide a method for spelling words using an arbitrary phonetic alphabet.

Generally, a phonetic alphabet is a particular set of words used to denote letters, such as the one used in air traffic control. One technical advantage of certain embodiments of the present invention is that a user of an interactive spelling system may use any recognizable word to indicate a letter rather than being restricted to a predefined phonetic alphabet.

In a first embodiment, a method for receiving spelling information from a user of an interactive voice response system includes receiving one or more recognizable words from a user. The method further includes identifying a first letter of each recognizable word, and determining a spelling based on the first letters. In a second embodiment, an interactive voice response system includes an interface, a memory, and a processor. The interface receives speech from a user. The memory stores recognizable words, and the processor identifies recognizable words corresponding to spoken words received from the user and determines a spelling based on the first letters of the words.

In a third embodiment, an interactive voice response system includes an interface, a memory, and a processor. The processor has two modes of operation. In the first mode, the processor receives spoken words from a user, determines a corresponding recognizable word in the memory, and stores the received word. In the second mode, the processor receives a spoken word from the user, determines a recognizable word corresponding to the spoken word, and stores the first letter of the received word.

Important technical advantages of certain embodiments of the present invention include the ability for users of an interactive voice response system to spell complicated words that may not be clear from pronunciation. In words such as street addresses, email addresses, and similar information, correct spelling is crucial. Words in a foreign language or names derived from a foreign language may be spelled unambiguously using the methods of certain embodiments of the present invention. Furthermore, words that may not be able to be identified by the interactive voice response system originally from the pronunciation may be identified as recognizable commands or vocabulary of the system.

Other important technical advantages of certain embodiments of the present invention include text messaging using an interactive voice response system. Existing systems for text messaging often require a human transcriber to write spoken messages down, and these messages are then entered manually for a later communication to a user of a pager, cell phone, or other text messaging device. Certain embodiments of the present invention may serve to replace the human interaction required for text messaging by allowing users of an interactive voice response system to spell words out clearly.

Yet another technical advantage of certain embodiments of the present invention is the use of an arbitrary phonetic alphabet. Rather than having to memorize particular words corresponding to letters of the alphabet, users of certain embodiments of the present invention may use any recognizable word to indicate a letter. This greatly increases the flexibility of an interactive spelling system.

Still another technical advantage of certain embodiments of the present invention is the ability of an interactive speech system to interactively learn vocabulary used by a particular user. This information allows the system to more effectively prompt the user for spellings. For example, the system may determine that the user is using words from a certain category to indicate letters. The system may then use words in the same category to prompt the user, thus increasing the likelihood that the word is recognized.

Particular embodiments of the present invention may include some, all, or none of the enumerated technical advantages. Additional technical advantages will be apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
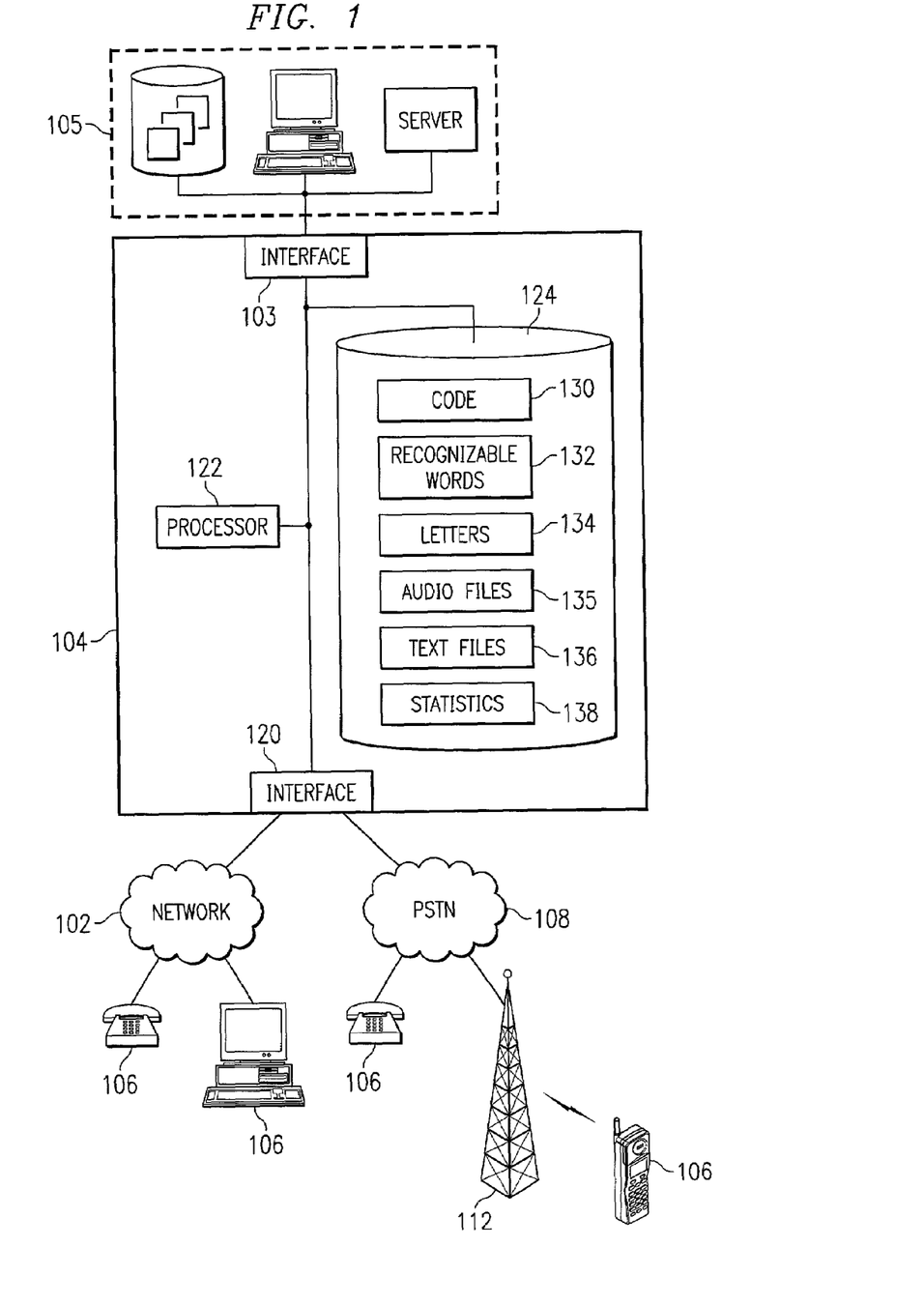
FIG. 1 shows an interactive voice response system (IVR) in accordance with an embodiment of the present invention.

FIG. 1 shows an interactive voice response system 100 that allows users of endpoints 106 to communicate with an interactive voice response server (IVR) 104 using network 102. System 100 allows users to access IVR 104 and other resources accessible by network 102 by voice command alone. Thus, interactive voice response system 100 provides users with access to computer systems in areas where resources might not otherwise be available.

Network 102 represents any hardware and/or software configured to communicate information. Network 102 may include the Internet, Extranets, local area networks (LANs), wide area networks (WANs), Internet protocol (IP) networks, asynchronous transfer mode (ATM) networks, optical networks, or any other suitable configuration or communication of information. Network 102 may include routers, hubs, switches, gateways, or any other suitable component. Network 102 may communicate information in the form of packets, cells, segments, frames, or other portions of data (generally referred to as "packets").

Endpoints 106 represent any hardware and/or software for receiving spoken information from a user, converting that information into a signal, and communicating the signal to network 102. For example, endpoints 106 may include telephones, wireless phones, personal computers running voice software, or any other suitable device for receiving voice information from a user. Endpoints 106 may communicate information on the public switched telephone network (PSTN) 108, either directly to server 104 using a voice connection or through network 102 using a media gateway 110.

IVR 104 represents any hardware and/or software for receiving voice information from users of endpoints 106 and translating the spoken information into recognizable letters or vocabulary. Although depicted as a server 104, IVR 104 may represent any suitable component in any relationship with other elements of network 102. IVR 104 includes a network interface 120, a computer interface 103, a processor 122, and a memory 124.

Computer interface 103 represents any port or connection, real or virtual, for allowing server 104 to exchange information with computer system 105. Computer interface 103 allows IVR 104 to execute commands, retrieve information, store information, or perform any other suitable task using information in computer system 105. Computer system 105 may include any combination of hardware and/or software in any kind or arrangement.

Network interface 120 represents any port or connection between IVR 104 and network 102. Network interface 120 may be a virtual or physical port. Network interface 120 may also represent several physical and/or virtual connections to different elements of network 102. In a particular embodiment, network interface 120 receives voice information from a user directly from PSTN 108 and converts the received information into a suitable electronic format.

Processor 102 represents any hardware and/or software configured to process information. Processor 102 may include a microprocessor, microcontroller, digital signal processor (DSP), any combination of these devices, or any other suitable information processing hardware and/or software. Processor 122 may receive information from interface 120 and communicate information to interface 120 for presentation to a user. Processor 122 also accesses computer system 105 and memory 124 to retrieve information and to perform any other task that computer system 105 or processor 122 is able to perform.

Memory 124 represents any form of information storage. Memory 124 may include magnetic media, optical media, random access memory (RAM), read-only memory (ROM), removable media, or any other type of information storage, whether non-volatile or volatile. Memory 124 may represent local components of IVR 104, but may also include remote components accessible by IVR 104 using interface 120 over network 102.

Code 130 represents logical instructions embodied in a computer readable medium. Code 130 includes instructions executable by processor to cause processor 122 to receive information, to process information, and to communicate information to other components of network 102. Code 130 also includes software allowing processor 122 to parse audio information received from the user of an endpoint 106 into recognizable words and characters.

Recognizable words 132 represent any collection of characters corresponding to a spoken word. Recognizable words 132 may be organized into any suitable categories, and may be classified by first letter. Recognizable words 132 are each associated with an audible word that is embodied as an electronic representation of a spoken word. Processor 102 compares audio information received from a user to the audio information associated with recognizable words 132, thus allowing processor 122 to determine a recognizable word 132 that corresponds to the incoming audio data.

Letters 134 include any alphabetic characters, but may also include numbers or other characters that might be used in spelling. For example, letters 134 may include the "@" symbol used in electronic mail addresses. Letters 134 may be associated with recognizable words 132, so that the first letter 134 of each recognizable word 132 is associated with that recognizable word 132.

Audio files 135 represent audio information corresponding to the pronunciation of recognizable words 132 and letters 134. When receiving sounds from a user, IVR 104 compares the sounds to audio files 135 to determine a corresponding recognizable word 132 or letter 134. In a particular embodiment, IVR 104 compares an electronic representation of received sounds to the audio information in audio files 135, and uses statistical analysis to identify recognizable words 132 and letters 134 corresponding to the received sounds.

Text files 136 represent audio information received from the user converted to written words stored in electronic form in memory 124. Text files 136 may include both recognizable words 132 from a user's speech and letters 134 identified directly from a user's speech or generated by the interactive spelling method described in detail below.

Statistics 138 provide information on the usage of IVR 104. For example, statistics 138 may monitor the frequency of particular recognizable words 132 being spoken during interactions with users of endpoints 106. This information may be used to determine commonly-used recognizable words 132 that will be more likely to be recognized by a user of IVR 104.

In operation, IVR 104 receives audio information from the speech of a user of an endpoint 106. Processor 122 receives the audio information from interface 120, and attempts to identify recognizable words 132 in the received audio information. Processor 122 may interpret some of the recognizable words 132 as commands referring to a portion of code 130 to be executed by processor 122 or to a function performed by computer system 105, and interpret others as recognizable words 132 to be stored in text files 136. Processor 122 generally will recognize a word if it matches the audio file 135 representing the recognizable word 132 stored in memory 124 within a certain degree of statistical certainty. If processor 122 is not able to determine the particular word within a certain level of statistical certainty, processor 122 may prompt a user for a spelling of the word. Alternatively, the user may initiate the spelling mode when the user believes that the word to be spoken would be difficult for processor 122 to identify.

Either when processor 122 cannot distinguish a word, or when the user instructs IVR 104 to receive a spelling, IVR 104 transitions from a word receiving mode to a spelling mode. In a first embodiment IVR 104 prompts the user with a selection of two or more recognizable words 132 from which the user may select one. IVR 104 selects the words to distinguish between two or more similar sounding words. Thus, for example, if the processor could not tell whether a particular letter was a B or a D, processor 122 could play a prompt to the user such as "Did you say 'B' as in Bob, or 'D' as in Doug?" The user may then reply with one of the recognizable words 132, which processor 102 then recognizes as one of the recognizable words 132 that was played back. Processor 122 may use this information to distinguish two similar letters. Such an embodiment is also useful when processor 122 has identified two possibilities for a word without being able to tell them apart, such as "bear" and "pear." In that case, processor 122 may play a similar prompt that distinguishes the letters. For example, processor 122 may play "Did that word start with 'B' as in Bob or 'P' as in Paul?"

In a second embodiment, processor 122 prompts the user for the spelling of a word that processor 122 did not recognize. For example, processor 122 may play a prompt to the user such as "Please spell the word [ambiguous word] by speaking words that start with the corresponding letters in the word." The user may then utter any particular word that the user chooses that starts with the corresponding letters. For example, the user might spell Bob as "Bravo" "Oscar" "Bravo." In principle, the user may use any recognizable word 132 in memory 124 of IVR 104. If processor 122 has any difficulty determining the word that the user is speaking, processor 122 may use the method for distinguishing two words described in connection with the first embodiment.

In a third embodiment, processor 102 may prompt the user to spell a particular word, and but not necessarily require the user to spell the entire word using a phonetic alphabet. For example, processor 122 could receive a combination of letters 134 and recognizable words 132 and use the combination to spell the words such as receiving "B as in banana, O, G, A as in apple, R, T" from a user. In a variation on this embodiment, processor 122 does not have separate word recognition modes and spelling modes. In such a variation, processor 122 receives individual letters along with recognizable words 132. Processor 122 may also interpret certain recognizable words 132 as letters based on cues from the user. For example, while speaking a series of words, the user might say "B as in Bob", and processor 122 would recognize that Bob is to be used as a cue for the proper spelling of a word, rather than storing the literal phrase "B as in Bob."

Once IVR 104 recognizes words, IVR 104 can use the recognized words 132 for any suitable purpose, such as accessing information in computer system 105, text-to-speech applications, playback to the user, or any other use of that information. Although particular embodiments of IVR 104 have been described in detail, the described techniques for interactive spelling may be implemented in a variety of ways. For example, IVR 104 need not be a remote server, but instead may represent hardware and/or software used for speech recognition in any user device, including endpoint 106. Overall, the techniques described may apply to any form of interactive voice recognition, whether performed locally or remotely.

In any of these embodiments, IVR 104 may use statistics 138 gathered from users and categorization techniques to increase the reliability and accuracy of the interactive spelling process. For example, IVR 104 may track the number of times that a particular word has been used to indicate a particular letter. This information may then be used to prompt the user with the most common word starting with that letter, so that the user is more likely to recognize which letter IVR 104 is attempting to indicate. In another variation, IVR 104 can identify a category for recognizable words 132 used by the user to spell out words. For example, IVR 104 may note that the user prefers to use animals, plants, names, or recognized phonetic alphabets such as those used in the military to spell out words. IVR 104 then uses words in the same category to prompt the user, thus increasing the likelihood that the user will recognize the word used in the prompt.

Figure 2:
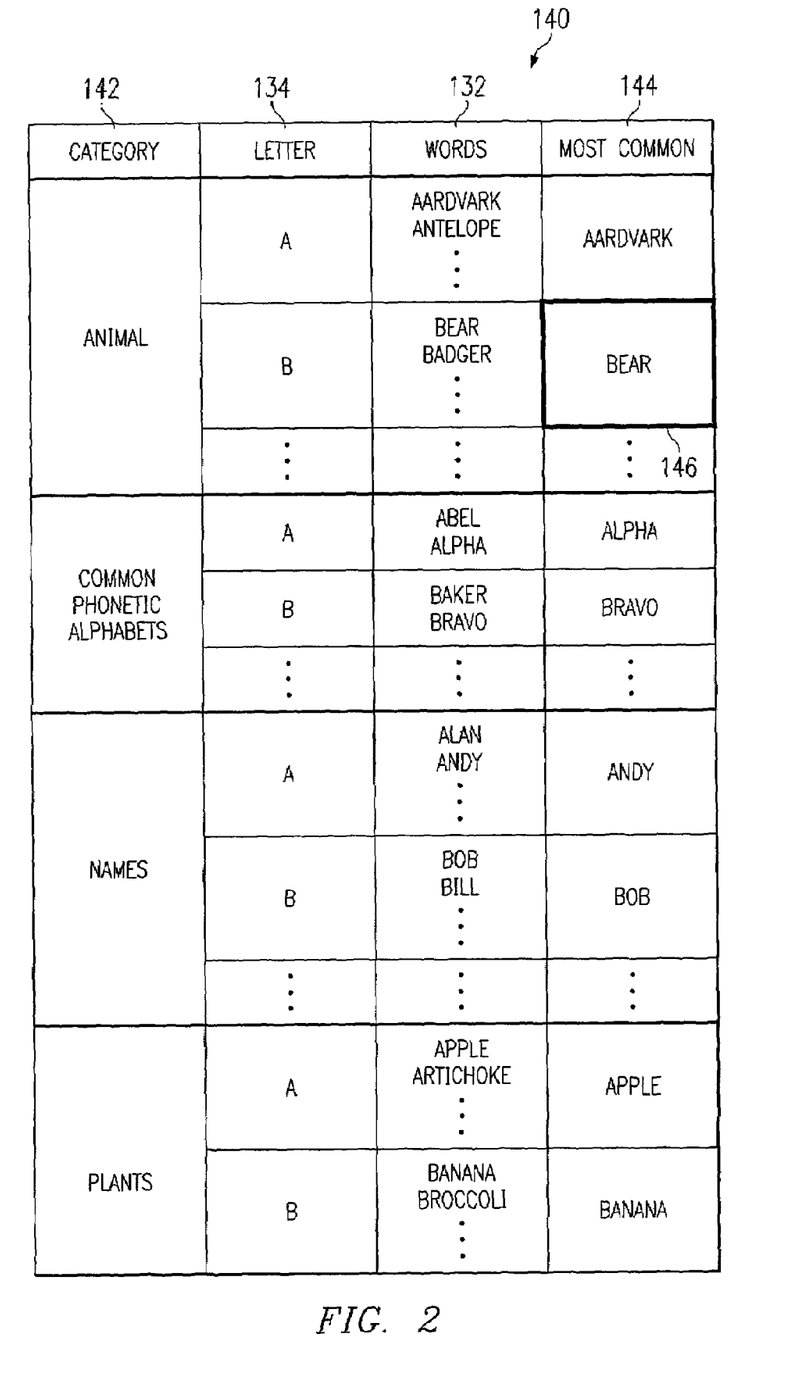
FIG. 2 is a table containing recognizable words organized into categories.

FIG. 2 shows a table 140 that organizes recognizable words 132 and letters 134 into categories 142 in order to facilitate operation of IVR 104. Each category 142 specifies a generic class of word into which various recognizable words 132 may be classified. Within each category, each word 132 is associated with its first letter 134. Thus, in the "Animal" category 142, "aardvark" and "antelope" are associated with the letter "A."

Column 144 lists the word 132 most commonly used by users to indicate a particular letter 134 in each category. For example, cell 146 shows that the word "Bear" is the animal most commonly spoken by users to indicate the letter "B." As IVR 104 interacts with more users and collects more statistics 138 over time, IVR 104 updates the contents of column 144 to reflect the fact that one word is used more prevalently.

In operation, IVR 104 may use table 140 in a number of ways. For example, IVR 104 may incorporate the most common words 144 in a particular category when prompting the user for a particular spelling. Because the words are the most common, they will more likely be recognized and understood by the user, thus increasing the likelihood that the prompt will accomplish its purpose. By using a particular category 142 of words in prompts, IVR 104 may also increase the likelihood that the user will understand a particular word in the prompt by inference from that category 142. Alternatively, IVR 104 may indicate a particular word to the user by prompting with the word most commonly used to represent that letter 134 across all categories.

Another use of categories 142 in table 140 is to identify a particular category 142 that a particular user is using most often to indicate spellings. For example, each time IVR 104 receives a word used to indicate a letter, IVR 104 may determine the category 142 of the word using the information in table 140. IVR 104 keeps track of the frequency with which the user presents words of a particular category, and uses the information to identify the most common category used to indicate letters. IVR 104 then uses words in that category in subsequent prompts to the user, thus providing increased likelihood that the particular user will recognize words used to prompt the user. Furthermore, IVR 104 can then use the identified category 142 to improve its own recognition algorithms. For example, if the user says the word "bear" to indicate a "B," IVR 104 may have difficulty distinguishing whether the user said "bear" or "pear." But if IVR 104 has determined that the user is using animals rather than plants to indicate letters, IVR 104 can conclude that the user is probably saying "bear" rather than "pear."

Figure 3:
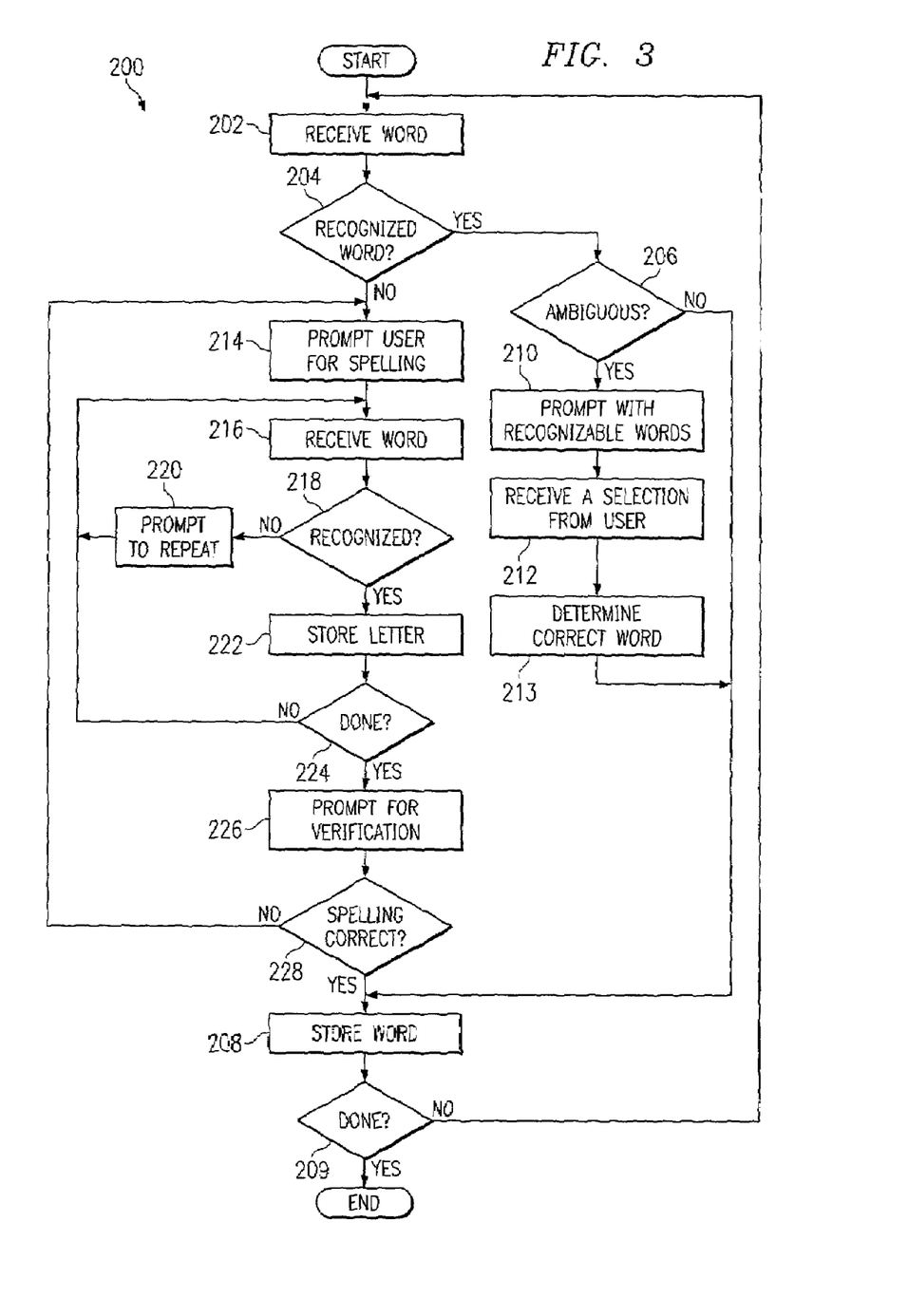
FIG. 3 is a flow chart illustrating a method for IVR-initiated spelling.

FIG. 3 is a flowchart 200 illustrating a method for IVR-initiated spelling. IVR 104 receives a word from a user at step 202. At step 204, IVR 104 determines whether the word is recognized as corresponding to one or more recognized words 132 within a required degree of statistical certainty. If the word is recognized, IVR 104 then determines whether it is possible to identify a particular word within a requisite degree of statistical certainty, or whether the word is instead ambiguous at step 206. If the word is recognized and not ambiguous, then IVR 104 stores the word in text file 136 at step 208. On the other hand, if the word is ambiguous, IVR 104 prompts the user of IVR 104 with recognizable words 132 that may be used to distinguish the potential words at step 210. For example, if IVR 104 was trying to distinguish between the words "bog" and "dog," then IVR 104 might play a prompt "does this word start with the letter 'B' as in Bob or 'D' as in Doug?" IVR 104 then receives a selection of one of the recognizable words 132 from the user at step 212, and determines the correct word based on the selection at step 213. Once the correct word is determined, IVR 104 stores the word in text file 136 at step 208.

When a word is not recognized by IVR 104, IVR 104 may prompt the user to spell the word at step 214. In a particular embodiment, IVR 104 prompts the user for a spelling by instructing the user to spell out the word with recognizable words 132 corresponding to letters 134 of the word to be spelled. When the user then speaks, IVR 104 receives a word from the user at step 216. IVR 104 then determines if the word is recognized or not at step 218. If the word is not recognized, IVR 104 may prompt the user to repeat the word at step 220. Otherwise, IVR 104 stores the first letter of the recognizable word 132 in a text file 136. At step 224, IVR 104 determines whether the user is finished with spelling the word, which may be indicated by the user or may be determined by a pause or other indication in the user's speech pattern or by any other suitable indication. If the word has been completely spelled, IVR 104 then prompts the user for verification at step 226. If the user fails to verify the spelling, IVR 104 restarts the interactive spelling process at step 214. If the spelling is correct, IVR 104 stores the word at step 208. If the spelling is not yet complete at step 224, IVR 104 waits to receive a new recognizable word corresponding to a letter at step 216.

After a word has been stored at step 208, IVR 104 may determine whether to continue receiving words at decision step 209 based on a suitable indication from the user. If the user opts to continue, IVR 104 receives a new word at step 202 for storage. Otherwise, the method is complete.

Figure 4:
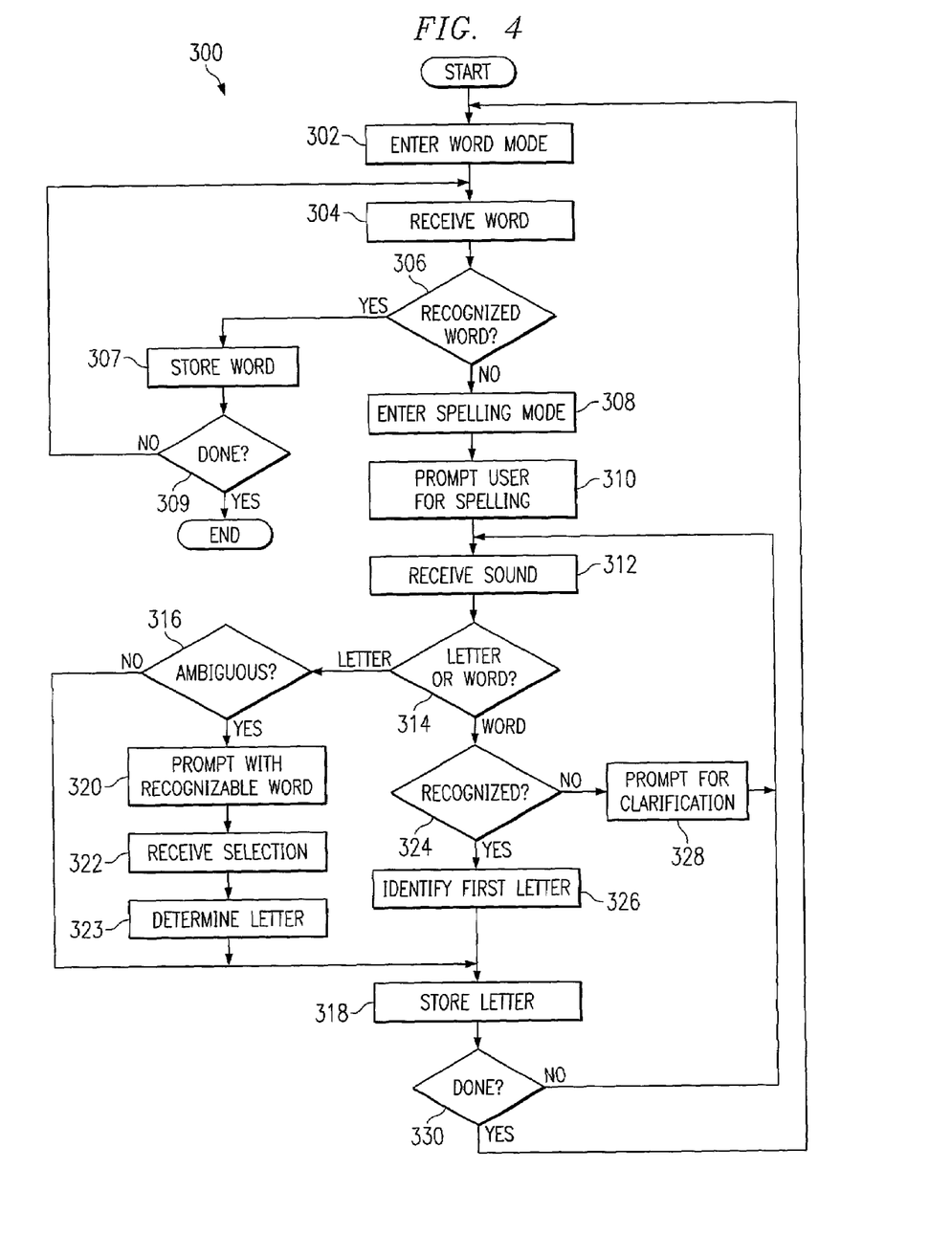
FIG. 4 is a flow chart illustrating a two-mode method for IVR-initiated spelling that includes receiving both letters and words in spelling mode.

FIG. 4 is a flowchart 300 illustrating an alternative IVR-initiated method for spelling. In this embodiment, IVR 104 has a word recognition mode for storing words received from a user, and a spelling mode in which IVR 104 may receive a combination of words and letters used in spelling a word. IVR 104 begins the method in word recognition mode at step 302. IVR 104 receives a word from the user at step 304, and determines whether the word is recognized at step 306. If the word is recognized, IVR 104 stores the word at step 307. At step 309, IVR 104 determines whether there are any more words to be received based on an indication from the user, which may be a voice command, dual tone multi-frequency (DTMF) tone, or other suitable form of indication. If there are more words to be received, IVR 104 continues receiving words at step 304.

If the word is not recognized, IVR 104 enters spelling mode at step 308. In spelling mode, IVR 104 prompts the user for spelling of a word at step 310. IVR 104 then detects sounds from a user at step 312. IVR 104 then determines whether the sound corresponds to a letter or word at step 314.

If the sound corresponds to a letter, IVR 104 then determines whether the letter is identifiable or ambiguous at step 316. If the letter is not ambiguous IVR 104 stores the letter at step 318. If the letter is ambiguous then IVR 104 prompts the user with recognizable words 132 at step 320, and receives a selection of one of the words from the user at step 322. The selection allows IVR 104 to determine a letter based on the selection at step 323 and to store a letter at step 318.

If IVR 104 receives a word from the user, IVR determines whether the word is recognized or not at step 324. If the word is recognized, IVR 104 identifies the first letter of the word at step 326 and then stores the letter at step 318. If the word used for spelling purposes is not recognized, then system 100 prompts for a new word at step 328. At step 330, IVR 104 determines whether the word has been spelled completely. This determination may be made based on user input or detecting any other suitable indication that the user has stopped spelling out the word. If spelling is complete IVR 104 may reenter word recognition mode at step 302. Otherwise, IVR 104 may receive a new sound from the user at step 312.

Figure 5:
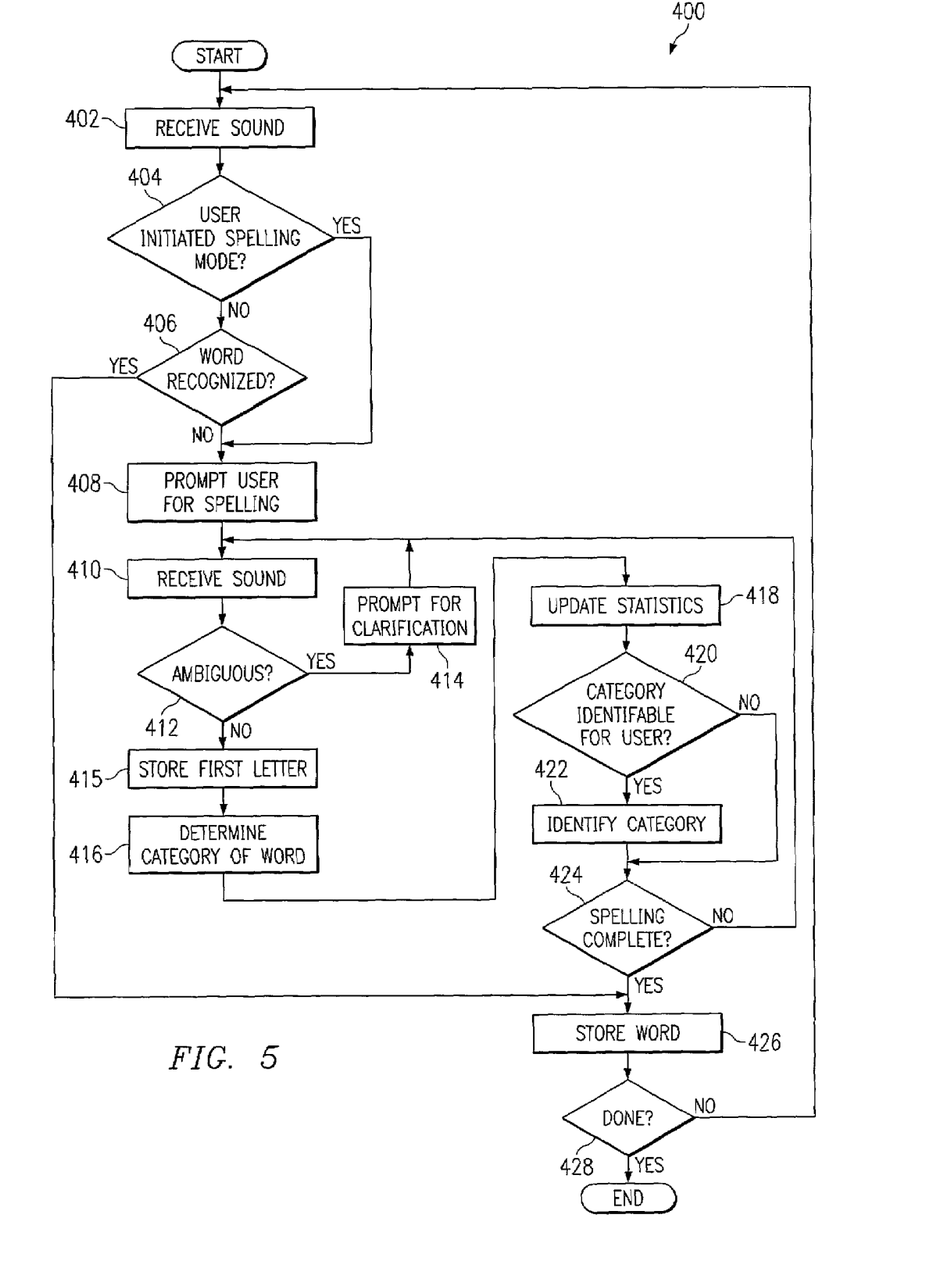
FIG. 5 is a flow chart illustrating an interactive spelling method in which an IVR determines a category of recognizable words associated with the user.

FIG. 5 is a flow chart 400 illustrating an interactive spelling method including the ability of IVR 104 to learn categories. IVR 104 receives a sound at step 402. IVR 104 determines based on the sound whether the user wishes to initiate a spelling mode at step 404. This determination may be based on IVR 104 recognizing a particular command, receiving a particular phrase, detecting a sound corresponding to a latter, receiving a dual tone multi-frequency (DTMF) tone corresponding to a command to spell, or any other suitable indication from the user. If the user has not given a command to enter spelling mode, IVR 104 then determines whether the sound corresponds to a recognizable word at step 406. If the sound corresponds to a recognizable word, IVR 104 stores the word at step 426. IVR 104 then determines if there are any more words to be entered at step 428. To make this determination, IVR 104 may monitor for a suitable indication from the user that the user is done entering information, such as a particular DTMF tone. If more words remain to be entered, IVR 104 continues receiving sounds at step 402.

Either at the user's request or when IVR 104 cannot recognize a word in word mode, IVR 104 may enter spelling mode. In spelling mode, IVR 104 may optionally prompt the user for a spelling at step 408, or may receive sounds without a prompt, particularly when the user initiated spelling mode. IVR 104 receives sounds from the user at step 410, and identifies sounds based on the letters in a suitable manner, which may include any of the methods described in conjunction with FIGS. 3 and 4. If these sounds are ambiguous at decision step 412, IVR 104 prompts the user for clarification at step 414.

Once a recognizable word 132 is received, IVR 104 stores the first letter of the word, or if the sound is a letter, the letter itself. IVR 104 determines an appropriate category 142 for a received word at step 416. IVR 104 updates statistics 138 based on the determination at step 418. IVR 104 may update global statistics relating to all users as well as individual statistics for the particular user. IVR 104 may also update the most common words 144 used to indicate a particular letter 134 based on the category 142.

At step 420, IVR 104 analyzes statistics 138 to determine if a particular category 142 of words is identifiable with the user. IVR 104 makes this determination based on predetermined statistical rules as well as previously collected statistics 138 about the particular user. If category 142 is identifiable, IVR 104 identifies category 142 and associates that category 142 with the user. IVR 104 may subsequently use category 142 to aid in selecting words to use in prompts to the user, such as in steps 408 and 414. IVR 104 may also use category 142 to assist in recognizing words at step 406 and resolving ambiguities at step 412.

After each word or letter is received in spelling mode, IVR 104 determines whether the user has completed the spelling process at step 424. IVR 104 makes this determination based on indications from the user similar to those used to determine whether the user is done entering words at step 428. If spelling mode is complete, IVR 104 stores the spelled word at step 426. Otherwise, IVR 104 continues to receive sounds in spelling mode at step 410.

Although particular embodiments of methods for interactive spelling have been described, numerous variations will be apparent to one skilled in the art. For example, IVR 104 may be able to learn the spelling of new words after they have been spelled once, so that a word that was previously unrecognizable may become recognizable. The degree and manner of interaction with the user, including the kind of commands received and the kind of prompts submitted to the user, may vary as well. The particular modes described are only examples from a wide variety of possible methods, and particular steps may be added, omitted, or performed concurrently or continuously in any suitable order without significantly affecting the overall operation of the methods described.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for receiving spelling information from a user of an interactive voice response system, comprising:
    receiving one or more recognizable words from a user of an interactive voice response system;
    for each recognizable word, identifying a first letter of the recognizable word;
    determining a spelling based on the first letters of the recognizable words;
    determining statistics for a plurality of previous users of the interactive voice response system, the statistics comprising a number of times each one of the recognizable words has been used to indicate a letter;
    identifying the recognizable word that is most commonly used for each letter;
    prompting the user with at least two recognizable words that are most commonly used, each recognizable word corresponding to a different letter; and
    receiving a selection of one of the recognizable words provided to the user.

2. The method of claim 1, further comprising prompting the user for the spelling.

3. The method of claim 2, further comprising:
    identifying a category for one or more of the recognizable words received from the user; and
    using recognizable words from the category in a subsequent prompt to the user.

4. The method of claim 1, further comprising:
    determining that a spoken word received from the user does not match a recognizable word within a specified degree of statistical certainty; and
    in response to determining that the spoken word is not recognizable within the specified degree of statistical certainty, prompting the user for a spelling of the spoken word.

5. The method of claim 1, wherein:
    the method further comprises receiving one or more spoken letters from the user; and
    the spelling is determined based on the spoken letters and the first letters of the recognizable words.

6. The method of claim 1, further comprising:
    determining that the spelling of the particular word corresponds to a particular recognizable word; and
    prompting the user with the particular recognizable word.

7. An interactive voice response system, comprising:
    an interface operable to receive speech from a user;
    a memory operable to store a plurality of recognizable words, the memory is further operable to store statistics for a plurality of previous users, the statistics comprising a number of times each one of the recognizable words has been used to indicate a letter; and
    a processor operable to:
        determine whether a spoken word received from the user corresponds to one of the recognizable words;
        determine a first letter for each spoken word that corresponds to one of the recognizable words;
        determine a spelling using the first letters; and
        determine a particular recognized word to be used in a prompt based on the statistics.

8. The system of claim 7, wherein the memory is further operable to store the spelling determined from the first letters.

9. The system of claim 7, wherein the processor is further operable to communicate the prompt to the user using the interface.

10. The system of claim 9, wherein the processor is further operable to:
    determine a category for the spoken word received from the user; and
    prompt the user with recognizable words in the category.

11. The system of claim 7, wherein the processor is further operable to:
    determine that the spoken word does not correspond to one of the recognizable words within a specified degree of statistical certainty; and
    prompt the user to spell the spoken word.

12. The system of claim 7, wherein the interface receives voice signals directly from the public switched telephone network.

13. An interactive voice response system, comprising:
    an interface operable to receive speech from a user;
    a memory operable to store a plurality of recognizable words, and store statistics tracking a number of times the user submits a word from each available category; and
    a processor operable to enter a first mode and a second mode, and the processor operable to:
        identify one of the recognizable words corresponding to a spoken word received from the user;
        in the first mode, store the received word in the memory; and
        in the second mode, store a first letter of the received word in the memory, and determine a category for the spoken word from a plurality of available categories.

14. The system of claim 13, wherein the processor is further operable to transition from the first mode to the second mode in response to being unable to identify the spoken word within a predetermined degree of statistical certainty.

15. The system of claim 13, wherein:
- the interface is further operable to receive a command from the user to transition from the first mode to the second mode; and
- the processor is further operable to transition into the second mode in response to receiving the command.

16. The system of claim 13, wherein, in the second mode, the processor is further operable to:
- identify individual spoken letters received from the user; and
- store the identified letters in the memory.

17. Logic embodied in a computer readable medium operable to perform the steps of:
- receiving one or more recognizable words from a user of an interactive voice response system;
- for each recognizable word, identifying a first letter of the recognizable word;
- determining a spelling based on the first letters of the recognizable words;
- determining statistics for a plurality of previous users of the interactive voice response system, the statistics comprising a number of times each one of the recognizable words has been used to indicate a letter;
- identifying the recognizable word that is most commonly used for each letter;
- providing the user with at least two recognizable words that are most commonly used, each recognizable word corresponding to a different letter; and
- receiving a selection of one of the recognizable words provided to the user.

18. The logic of claim 17, further operable to perform the step of prompting the user for the spelling.

19. The logic of claim 18, further operable to perform the steps of:
- identifying a category for one or more of the recognizable words received from the user; and
- using recognizable words from the category in a subsequent prompt to the user.

20. The logic of claim 17, further operable to perform the steps of:
- determining that a spoken word received from the user does not match a recognizable word within a specified degree of statistical certainty; and
- in response to determining that the spoken word is not recognizable within the specified degree of statistical certainty, prompting the user for a spelling of the spoken word.

21. The logic of claim 17, wherein:
- the logic is further operable to perform the steps of receiving one or more spoken letters from the user; and
- the spelling is determined based on the spoken letters and the first letters of the recognizable words.

22. The logic of claim 17, wherein the logic is further operable to perform the steps of:
- determining that the spelling of the particular word corresponds to a particular recognizable word; and
- prompting the user with the particular recognizable word.

* * * * *